US010071928B2

(12) United States Patent
Janjua

(10) Patent No.: US 10,071,928 B2
(45) Date of Patent: Sep. 11, 2018

(54) SYSTEMS AND METHODS FOR DE-OILING AND TOTAL ORGANIC CARBON REDUCTION IN PRODUCED WATER

(71) Applicant: FLUOR TECHNOLOGY CORPORATION, Aliso Viejo, CA (US)

(72) Inventor: Rafique Janjua, Sugarland, TX (US)

(73) Assignee: Fluor Technologies Corporation, Sugar Land, TX (US)

( * ) Notice: Subject to any disclaimer, the term of this patent is extended or adjusted under 35 U.S.C. 154(b) by 884 days.

(21) Appl. No.: 14/533,884

(22) Filed: Nov. 5, 2014

(65) Prior Publication Data

US 2015/0122481 A1  May 7, 2015

Related U.S. Application Data

(60) Provisional application No. 61/900,932, filed on Nov. 6, 2013.

(51) Int. Cl.
*E21B 43/40* (2006.01)
*C02F 9/00* (2006.01)
(Continued)

(52) U.S. Cl.
CPC .............. *C02F 9/00* (2013.01); *B01D 17/047* (2013.01); *E21B 43/2406* (2013.01); *E21B 43/40* (2013.01); *C02F 1/004* (2013.01); *C02F 1/42* (2013.01); *C02F 1/66* (2013.01); *C02F 1/682* (2013.01); *C02F 1/72* (2013.01);
(Continued)

(58) Field of Classification Search
None
See application file for complete search history.

(56) References Cited

U.S. PATENT DOCUMENTS 2,047,989 A    7/1936  Woelflin
3,623,608 A   11/1971  Waterman
(Continued)

FOREIGN PATENT DOCUMENTS

DE          233827 A1    3/1986
EP          2319901      5/2011
(Continued)

OTHER PUBLICATIONS

Norrie, Separation & Separators, Jan. 26, 2010, retrieved Dec. 7, 2017 from http://articles.compressionjobs.com/articles/oilfield-101/1008-separation-separators-well-fluid-coalescing?showall=1 (Year: 2010).*

(Continued)

*Primary Examiner* — Angela M DiTrani
(74) *Attorney, Agent, or Firm* — Conley Rose, PC

(57) ABSTRACT

Systems and methods for treatment of produced water form a steam assisted gravity drain operation are presented in which tight emulsions, total organic compounds, and solids are removed using a skim tanks that receives a multiphase mixture formed from a demulsifier and the produced water and that produces pre-treated water. The so formed pre-treated water is then subject to further total organic compounds reduction via combination with one or more oxidizing biocide to so form treated water that can be fed to a once through steam generator (OTSG) for re-injection into a formation.

20 Claims, 4 Drawing Sheets

(51) Int. Cl.
*E21B 43/24* (2006.01)
*B01D 17/04* (2006.01)
*C02F 1/68* (2006.01)
*C02F 1/42* (2006.01)
*C02F 1/00* (2006.01)
*C02F 1/66* (2006.01)
*C02F 1/72* (2006.01)
*C02F 101/32* (2006.01)

(52) U.S. Cl.
CPC .... *C02F 2001/425* (2013.01); *C02F 2101/32* (2013.01); *C02F 2101/325* (2013.01); *C02F 2209/06* (2013.01); *C02F 2303/04* (2013.01)

(56) References Cited

U.S. PATENT DOCUMENTS

| | | | |
|---|---|---|---|
| 3,951,806 | A | 4/1976 | Young |
| 4,142,967 | A | 3/1979 | Fremont |
| 4,399,028 | A | 8/1983 | Kile |
| 4,428,841 | A | 1/1984 | Favret, Jr. |
| 4,624,763 | A | 11/1986 | Chimenti |
| 4,883,602 | A | 11/1989 | Anderson |
| 5,156,745 | A | 10/1992 | Cairo |
| 5,378,353 | A | 1/1995 | Koch |
| 5,431,286 | A | 7/1995 | Ku |
| 5,435,920 | A | 7/1995 | Penth |
| 6,143,183 | A | 11/2000 | Wardwell |
| 6,875,351 | B2 | 4/2005 | Arnaud |
| 7,334,451 | B1 | 2/2008 | Fauveau |
| 7,703,613 | B2 | 4/2010 | Haslem |
| 7,758,738 | B2 | 7/2010 | Sams |
| 8,877,065 | B2 * | 11/2014 | Janjua ................ B01D 21/0042 210/221.2 |
| 2002/0112999 | A1 | 8/2002 | Lee |
| 2004/0031742 | A1 | 2/2004 | Arnaud |
| 2007/0102359 | A1 | 5/2007 | Lombardi |
| 2007/0111903 | A1 | 5/2007 | Engel |
| 2011/0031163 | A1 | 2/2011 | Byrne |
| 2013/0319663 | A1 * | 12/2013 | Buchanan ........... E21B 43/2406 166/272.3 |

FOREIGN PATENT DOCUMENTS

| | | |
|---|---|---|
| EP | 2319901 A1 | 11/2011 |
| GB | 2035285 B | 11/1979 |
| GB | 2489815 | 10/2012 |
| GB | 2489815 A | 10/2012 |
| JP | 02245286 A | 10/1990 |
| SU | 1270945 A2 | 2/1988 |
| WO | 0015343 A1 | 3/2000 |
| WO | 2006116533 | 11/2006 |
| WO | 2006116533 A2 | 11/2006 |
| WO | 2008137006 | 11/2008 |
| WO | 2008137006 A1 | 11/2008 |
| WO | 2010066266 A1 | 6/2010 |
| WO | 2012078732 A2 | 6/2012 |
| WO | 2013049378 | 4/2013 |
| WO | 2013049378 A2 | 4/2013 |
| WO | 2014035723 A1 | 3/2014 |

OTHER PUBLICATIONS

Anna Olander, Guided Wave Radars, Hydrocarbon Engineering, Apr. 2004.

Walter Driedger, Controlling Vessels and Tanks, Hydrocarbon Processing, Mar. 2000, also available at http://www.driedger.ca/ce6_v &t/CE6_V&T.html, pp. 6-1-6-20.

Emerson Process Management, Guided Wave Radar Saves $57,000 Annually for Gas Plant by Improving Measurement of Skim Tank, Rosemount 3300, 2006.

* cited by examiner

SYSTEMS AND METHODS FOR DE-OILING AND TOTAL ORGANIC CARBON REDUCTION IN PRODUCED WATER

This application claims priority to our U.S. provisional application with the Ser. No. 61/900,932, which was filed 6 Nov. 2013.

FIELD OF THE INVENTION

The field of the invention treatment of produced water, and especially produced water from steam assisted gravity drain (SAGD) operation, to produce a feed stream suitable for a once through steam generator (OTSG).

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

Removal of oil, solid phases, scum, and/or flocculated materials from aqueous fluids has been practiced in numerous industries for several decades, and depending on the specific contaminant, suitable devices can be chosen. For example, centrifugal separation or filtration is a relatively effective and fast method of separating fairly high concentrations of large solid particles from a liquid, however, has limited use where the particle size and/or concentration are relatively low. Moreover, especially where the volume of treated fluid is relatively large, centrifugal separation often becomes impractical due to the required rotor size and energy consumption.

Where the solid material has a lower density than the solvent (e.g., oil sludge, scum, coagulated, or flocculated materials) solids can often be easily removed without significant mechanical intervention in settling or holding tanks. However, where the effluent volume is relatively large and/or the density difference is relatively small, the required volumes for the settling or holding tanks and the time needed for separation would be impractical under most circumstances. To improve at least some aspects of separation, a skim tank imparting toroidal motion in a mixed phase and a conical weir have been described in WO 2008/137006. While such systems and methods improve certain parameters of operation, various drawbacks still remain, including issues with high dissolved organic solids, emulsions, etc. All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Separation of mixtures of undesirable components from water is further compounded by the presence of contaminants with various and distinct physicochemical parameters. For example, SAGD produced water has considerable quantities of dissolved organic compounds often in tight emulsions in addition to silica, inerts, and numerous organic hydrocarbonaceous compounds at high pH (e.g., pH>8.5). GB 2489815 describes a system of heating produced water to a degree that reduces hydrocarbon content in a distillation-type manner. However, such process is energy demanding and typically fails to reduce emulsified components and other small contaminants.

Still further, SAGD produced water will also have in many instances a high scaling index, rendering such water unsuitable for substantially all downstream equipment as untreated SAGD produced water tends to deposit oily scale on all wetted surfaces, even filter media. Because SAGD operation requires substantial quantities of water for steam generation and produces significant quantities of produced water, recycling water has become imperative. Indeed, some environmental regulations require up to 90% recovery of recycled water for steam production for enhanced oil recovery. Unfortunately, treated produced water is still often unsuitable for OTSG. In an effort to reduce difficulties with scaling in OTSG, produced water is treated by raising the pH to a level that significantly increases silica solubility and breaks emulsions. So treated water is then further processed to reduce water hardness prior to feeding into a steam generator to form intermediate quality steam as described in WO2013/049378. While such system provide several advantages over other known plants and methods, the quality of the treated water may still be problematic, especially where tight emulsions and numerous other contaminants are present.

Therefore, while numerous methods of mixed-phase separation are known in the art, all or almost all of them suffer from one or more disadvantages. Consequently, there is still a need to provide improved configurations and methods to improve mixed-phase separation, especially where colloidal clay/silica etc. are emulsified in a liquid.

SUMMARY OF THE INVENTION

The present invention is directed to configurations and methods of treating produced water from various sources, and especially from SAGD and re-use of the so treated water in a downstream component, particularly a OTSG for reinjection as steam.

In one aspect of the inventive subject matter, the inventor contemplates a method of treating produced water from a SAGD operation for recycling to the SAGD operation. In especially contemplated aspects of such methods, the produced water is received from the SAGD operation, emulsions are broken in the produced water using one or more demulsifying agent to so form a multiphase mixture. The multiphase mixture is then separated in a container that has a flow-control structure configured to force a first portion of a solid-depleted phase into a toroidal motion within the container and around the flow control structure. Most typically, the container is also configured to allow withdrawal of a second portion of the solid-depleted phase at a location at or below the flow control structure as pre-treated water. In yet another step, an oxidizing biocide is added to the pre-treated water in an amount effective to reduce total organic compounds below 30 ppm to so form treated water, which is then fed (after optional further treatment) to a once-through steam generator to produce steam for the SAGD operation.

In exemplary aspects, the produced water has a total organic compound (TOC) concentration of ≥350 ppm, a chemical oxygen demand (COD) of ≥1400 ppm, total dissolved solids (TDS) concentration of ≥1800 ppm, and emulsified oil/grease/solids concentration of ≥15 ppm, and the steps of separating and adding the oxidizer reduces TOC and/or COD by at least 50%, more typically at least 80%, and most typically at least 90%. While not limiting to the inventive subject matter, it is also contemplated that the pH is increased in the produced water or the multiphase mixture to further assist in breaking the emulsions.

Among other suitable choices, contemplated demulsifying agents include a polymer containing aromatic and oleophilic groups, a tetrapolymer containing random combinations of acrylic acid, methacrylic acid, methyl methacrylate and butyl acrylate, a hydrophilic cationic copolymer of acrylamide, a vinyl-type polymer derived from hydrophilic and hydrophobic vinyl monomers, cationic polymers of dimethylaminoethyl acrylate methyl chloride and benzyl chloride quaternary salts, a (meth)acrylate of oxyalkylates copolymerized with hydrophilic monomers, a polymer formed from hydrophobic(meth)acrylate ester monomers and hydrophilic(meth)acrylic acid monomers, and/or a hydrophobically modified, surfactant modified, and lightly crosslinked anionic acrylate copolymer. Suitable oxidizing biocides include oxygen, ozone, hydrogen peroxide, an inorganic peroxide, fluorine, chlorine, bromine, hypobromous acid, a hypohalite, chlorite, chlorate, perchlorate, chlorine dioxide, a chloroisocyanurate, monochloramine, bromochlorodimethylhydantoin, nitric acid, a nitrate salt, nitrous oxide, sulfuric acid, peroxydisulfuric acid, peroxymonosulfuric acid, 2,2'-dipyridyldisulfide, a hexavalent chromium compound, pyridinium chlorochromate, a chromate compound, a dichromate compound, a permanganate salt, a perborate salt, silver oxide, and/or osmium tetroxide.

In further contemplated aspects, the above method may further comprise a step of filtering the treated water and/or a step of subjecting the treated water to cation exchange chromatography. Most typically, the once-through steam generator produces steam from the treated water at a steam quality of at least 70%, and more typically at least 80%. Where even further reduction of TOC is desired, additional oxidizing biocide may be added in one or more positions to the produced water and/or the multiphase mixture.

Therefore, viewed from a different perspective, the inventor also contemplates a method of treating produced water from a SAGD operation for recycling to the SAGD operation. Most typically, such method will include a step of breaking an emulsion in the produced water using a demulsifying agent to form a multiphase mixture, a further step of using a skim tank to separate pre-treated water from the multiphase mixture, wherein the pre-treated water has a total organic compound level of below 100 ppm, and yet another step of adding an oxidizing biocide to the pre-treated water in an amount effective to reduce total organic compounds below 30 ppm to so form treated water. Finally, the treated water is then fed (directly, or via an cation exchange chromatography unit and/or filtration unit) to a once-through steam generator to produce steam for the SAGD operation. With respect to suitable demulsifying agents, oxidizing biocides, additional oxidizing biocides, and steam quality, the same considerations as already noted above apply.

In another aspect of the inventive subject matter, the inventor also contemplates a SAGD operation system that includes a well head that produces a hydrocarbon product and produced water. A first fluid injection port is fluidly coupled to the well head and allows combination of the produced water with a demulsifying agent to form a multiphase mixture, which is then fed to (or formed in) a skim tank that is fluidly coupled to the well head separates the multiphase mixture using a flow-control structure that is configured to force a first portion of a solid-depleted phase into a toroidal motion within the skim tank and around the flow control structure. Preferred skim tanks are further configured to allow withdrawal of a second portion of the solid-depleted phase at a location at or below the flow control structure as pre-treated water, and a second fluid injection port is configured to allow combination of the pre-treated water with an oxidizing biocide in an amount effective to reduce total organic compounds below 30 ppm to so form treated water. In such operations it is preferred that a once-through steam generator is fluidly coupled to the container and configured to produce steam for the SAGD operation from the treated water.

While not limiting to the inventive subject matter, it is generally preferred that the SAGD operation system further comprises a filtration unit that is fluidly coupled between the skim tank and the once-through steam generator, and/or an cation exchange unit that is fluidly coupled between the skim tank and the once-through steam generator. In further contemplated aspects, the skim tank is further configured to allow recycling of at least some of the second portion of the solid-depleted phase back into the flow control structure, and further includes an overflow element arranged in the container that is configured to allow removal of a solid/oil-enriched phase separated from the multiphase feed. Lastly, it is contemplated that the SAGD operation system is configured to allow recycling of at least 80% of the produced water to a formation connected to the well head.

Various objects, features, aspects and advantages of the present invention will become more apparent from the following detailed description of preferred embodiments of the invention, along with the accompanying drawing.

BRIEF DESCRIPTION OF THE DRAWING

Prior Art

DETAILED DESCRIPTION

The inventor has discovered that produced water can be processed in a conceptually simple and effective manner that helps avoid numerous components otherwise found in heretofore known treatment facilities for produced water. More specifically, the inventor discovered that produced water can be subjected to chemical emulsion breaking at a basic pH to so form a multiphase mixture that can be readily separated in a skim tank in which solids precipitate from the mixture and in which a solid-depleted phase is subjected to toroidal motion to so allow effective separation of an oil phase from pretreated water that is then withdrawn from the skim tank. Most notably, the inventor discovered that such treatment not only reduced the entrained solids, but also significantly reduced the TOC in the pre-treated water. To even further reduce the TOC, oxidizing biocides can be added to the treated water, which in many cases will reduce the TOC and COD.

Among numerous other advantages, it should be noted that such simplified treatment of produced water will allow for TOC reduction by 50-90% and entirely eliminate the solids sludge production, dewatering, and disposal otherwise needed for the lime/soda ash softening in conventional systems. Similarly, performance of downstream filtration and ion exchange units is greatly increased as less backwash and media exchange is required. Still further, as a consequence of higher quality treated water, OTSG operation is improved with higher steam quality, reduced or even eliminated scaling. Thus, in at least some instances, the steam separator for upgrading steam quality may be omitted.

Figure 1:
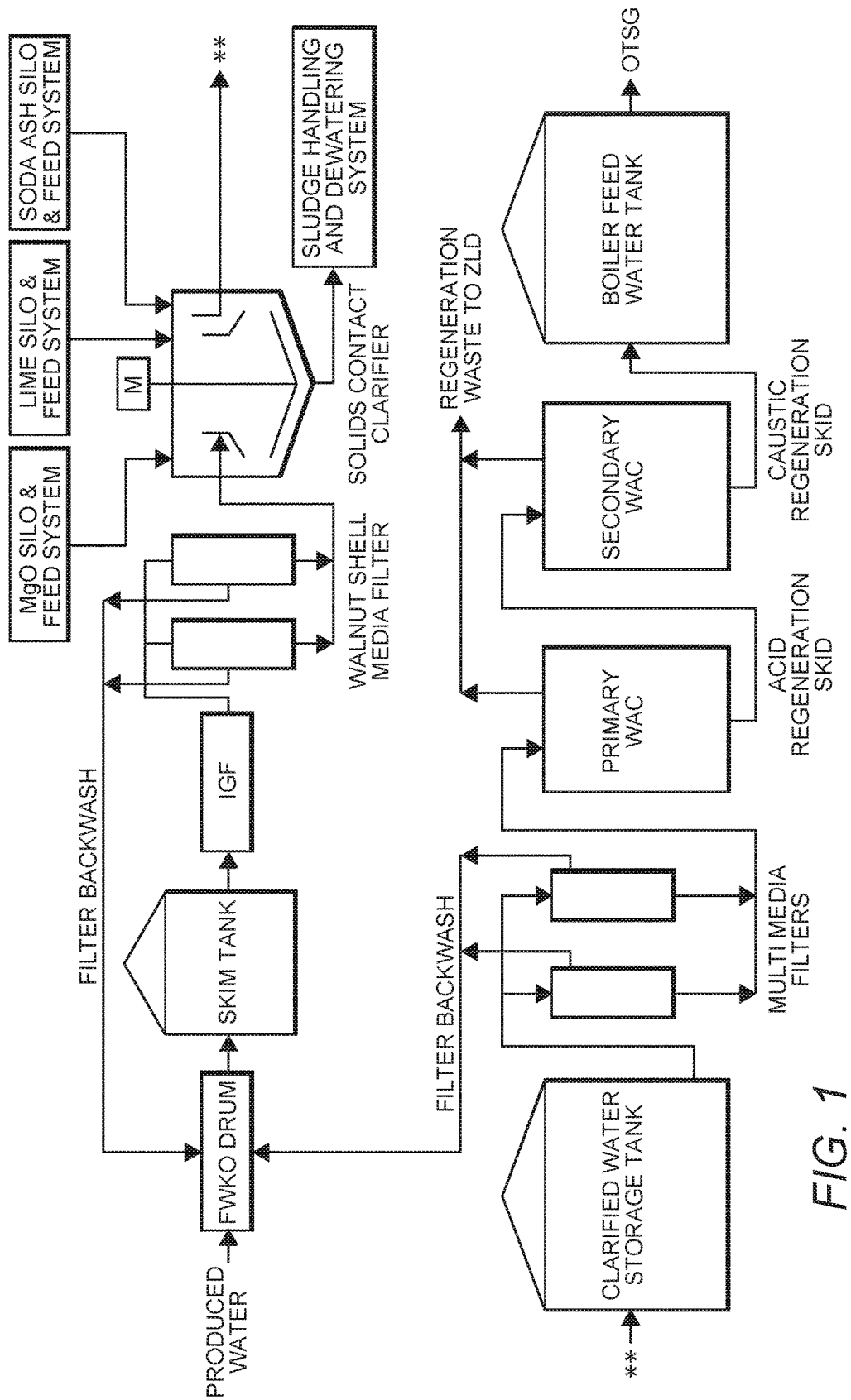
FIG. 1 is an exemplary schematic of a treatment system for produced water from SAGD.

Prior Art FIG. 1 exemplarily illustrates a typical plant configuration for treatment of produced water where produced water is combined with filter backwash from solid media filters (typically walnut shell or pecan shell media) in a free water knockout (FWKO) drum. The produced water is then fed into a skim tank that eliminates an oil phase to some degree. Induced gas flotation (IGF) units are then employed to treat the skim tank effluent to reduce the suspended matter in the effluent that is then subjected to magnesium oxide/lime/soda ash treatment for softening and sludge formation. The clarified water is (after storage) subjected to further solid media filtration before passing through primary and secondary weak acid cation (WAC) exchange units to so form boiler feed water for the OTSG.

Figure 2:
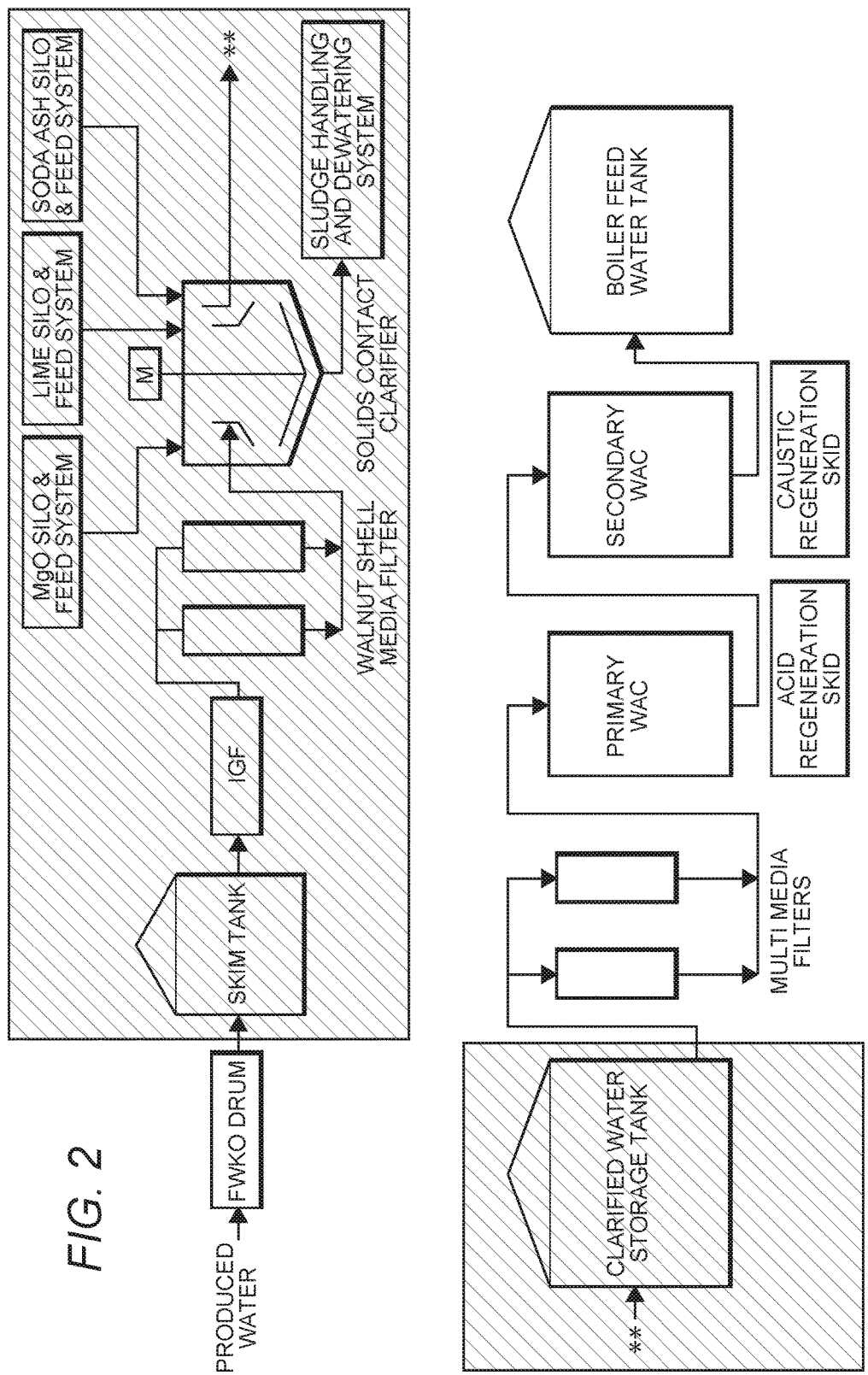
FIG. 2 is schematic illustration of the system of Prior Art FIG. 1 showing various components that can be eliminated using a modified skim tank operation.

As should be readily apparent from Prior Art FIG. 1, treatment of the produced water is relatively complex and capital intensive, and requires substantial plot space on a production site. In contrast, as is schematically illustrated in FIG. 2, the entire processing train that includes the skim tank, induced gas flotation unit, solid media filter unit, the solids contact clarifier, and the clarified storage water tank can be eliminated (hashed boxes) by replacement with the skim tank of the inventive concept as further detailed below.

Figure 3:
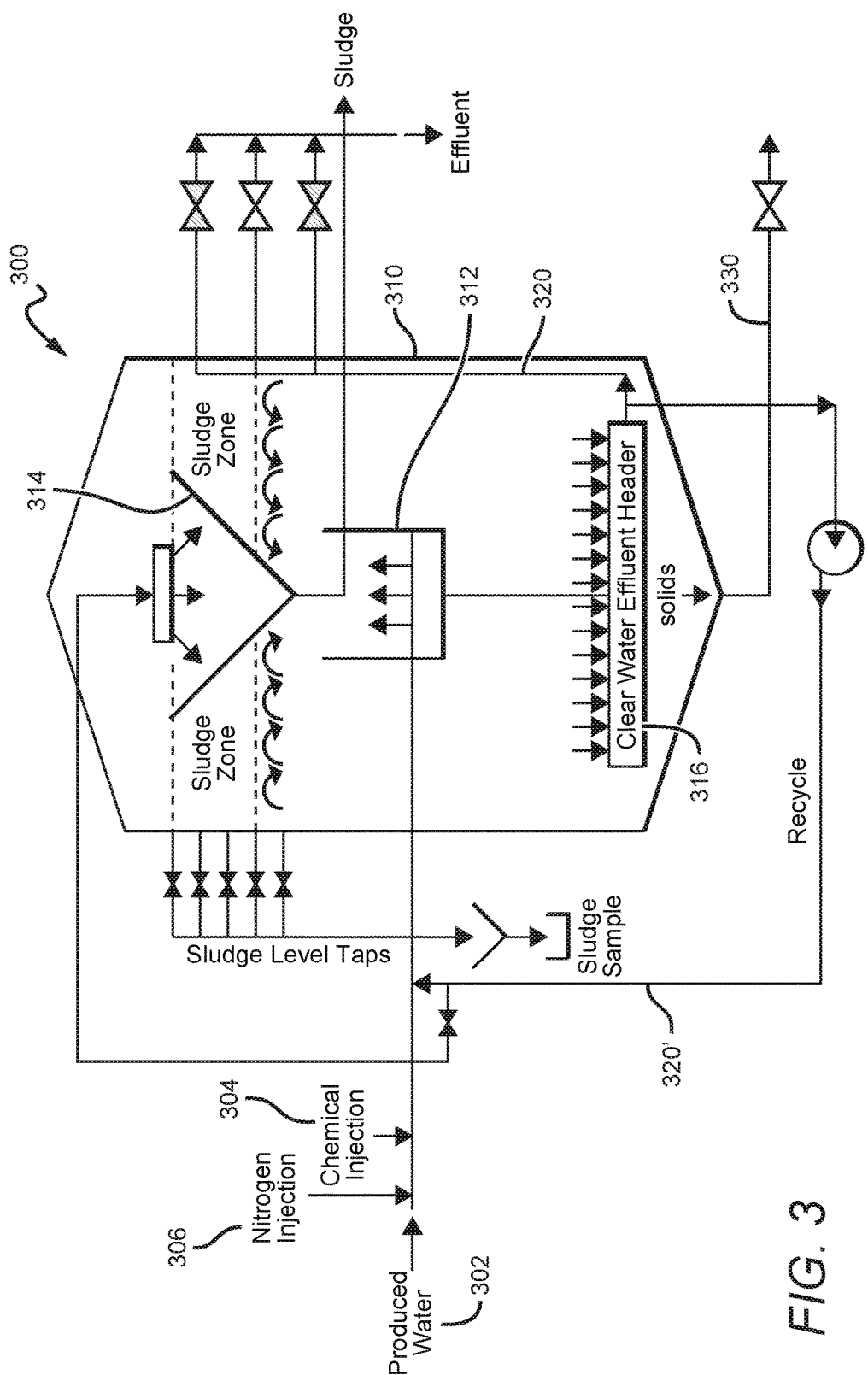
FIG. 3 is an exemplary schematic of a skim tank suitable for use in the inventive subject matter.

Here, in the exemplary modified skim tank configuration of FIG. 3, modified skim tank 300 receives a multiphase mixture of produced water 302 and demulsifier 304 (via a first fluid injection port) that also contains nitrogen gas 306. Most typically, the produced water 302 is provided from a FWKO that is coupled to a wellhead and that produces a hydrocarbon product (not shown). As desired, a portion of the solid-depleted phase 320' may be added to increase the circulation rate and toroidal motion in the container 310 of modified skim tank 300. Central flow control structure 312 is typically a cylindrical element centrally disposed within the container and cooperates with conical weir 314 to induce toroidal motion of the fluid in the container. A portion of the solid-depleted phase 320 is withdrawn from the container at a location at or below the flow control structure 312 (via clear water effluent header 316, while previously entrained solids will fall below the header and can be removed via solids conduit 330. It should be noted that such arrangement advantageously increases separation efficiency for at least several reasons. As the emulsions containing solids, organic matter, and hydrocarbons in the multiphase mixture have been broken, and as the mixture is subject to toroidal motion, the lighter phase, and especially organic matter and hydrocarbons rise to the top and can be withdrawn across weir cone 314 by raising the liquid level in the tank. At the same time, solids and adsorbed organic compounds settle to the bottom of the container and can also be simply withdrawn, leaving a pre-treated water with substantially reduced TOC that is withdrawn at a location at or below the flow control structure. Viewed from another perspective, the modified skim tank operates as both a hydrocarbon and TOC removal device and as a solids removal device, thus replacing several components of prior configurations with remarkably increased efficiency.

Figure 4:
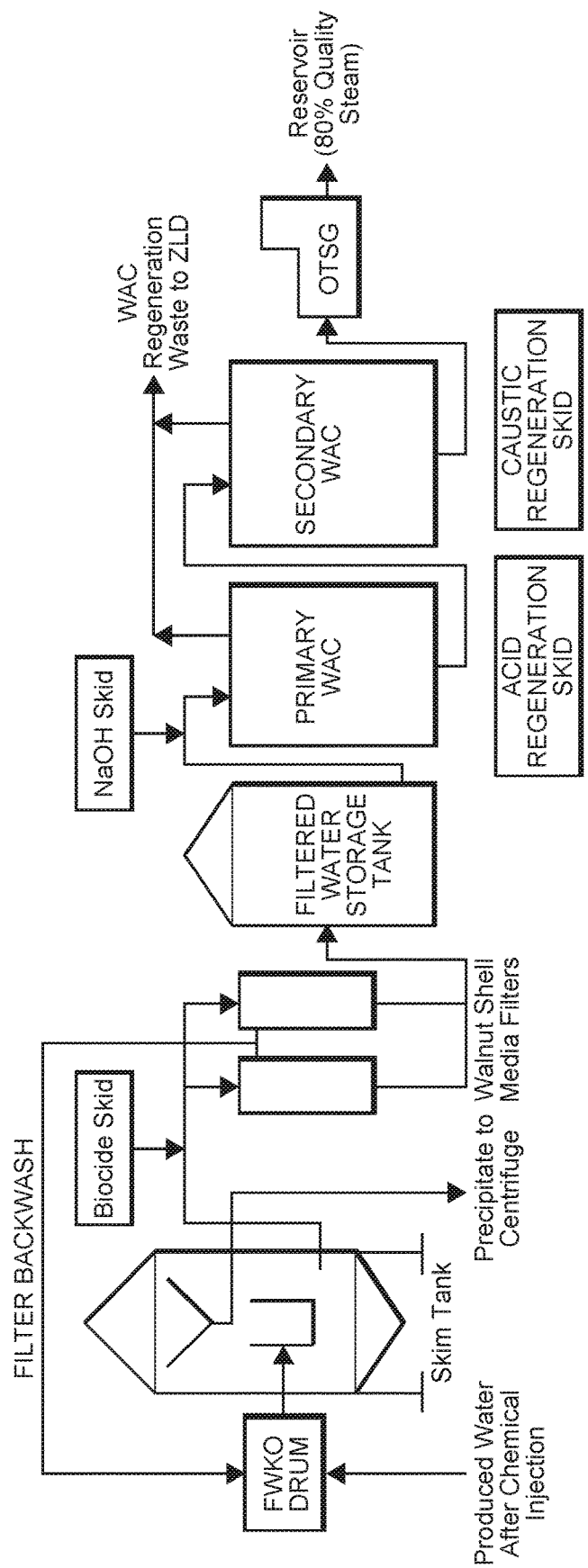
FIG. 4 is an exemplary schematic of a treatment system for produced water from SAGD according to the inventive subject matter.

The pre-treated water leaving the container 310 via effluent conduit 320 is preferably subjected to at least one additional treatment step with an oxidizing biocide to even further reduce the TOC and COD of the effluent. In most cases, the oxidizing biocide is added via a second injection port as exemplarily shown in FIG. 4. However, it should be appreciated that the oxidizing biocide may be added at one or more additional and/or alternative locations (e.g., to the multiphase mixture or produced water). Such treated water typically has a TOC of equal or less than 30 ppm. With further reference to FIG. 4, it should be appreciated that the treated water after oxidizing biocide injection is preferably further treated to remove fine particulates in a filter unit (e.g., walnut shell or other suitable media, including pecan shell, etc.). Once filtered, the water may be stored in a storage (or surge) tank for later use in SAGD operation. In such case, as also shown in FIG. 4, the filtered water is passed through one or more weak acid cation exchange units to remove divalent cations and so reduce scaling in the downstream OTSG. Most notably, water treated in such a manner is of significantly higher purity and can typically be used in the OTSG to produce a high quality steam (i.e., at least 80%, at least 85%, at least 90%, at least 95%).

Therefore, it should be recognized that produced water can be treated for subsequent use in a conceptually simple and effective manner avoiding various expensive processing steps. Most preferably, produced water is treated with one or more chemicals to a degree that is effective to break emulsions that are present in the produced water. So treated water is then de-oiled using conventional separation, and most preferably by one or more separation processes that do not require centrifugation or other mechanically complex devices. Therefore, downstream processes (e.g., filtration, ion exchange processes) that would otherwise be adversely affected by emulsions are now easily implemented. Once de-oiled and solids/precipitates have been removed, the water is alkalinized to a degree that is effective to reduce, or even entirely eliminate the need for silica removal, which in turn allows use of the alkalinized, de-oiled, and filtered water in downstream processes without further processing.

Viewed from a different perspective, systems and methods are contemplated in which produced water is processed by (preferably chemically) breaking emulsions such that the produced water can be de-oiled and filtered in simple processes, and by elevation of the pH to a degree that substantially increases silica solubility. Once de-oiled, filtered, and alkalinized, the treated water is fed to a steam generator, most preferably a once through steam generator (OTSG), to produce an intermediate quality steam. The intermediate quality steam is then either directly used for injection for SAGD, or separated in a condensate separator to thereby produce high quality steam and a condensate that can then be processed to produce a purified water product suitable for additional steam generation.

While not limiting to the inventive subject matter, it should be recognized that various oxidizing biocides may be used in conjunction with the teachings presented herein, and exemplary oxidizing biocides include oxygen, ozone, hydrogen peroxide, various inorganic peroxides, fluorine, chlorine, bromine, hypobromous acid, various hypohalites, chlorite, chlorate, percholate, chlorine dioxide, various chloroisocyanurates (typically organochlorine compounds that hydrolyze into hypochlorous acid and cynauric acid in water, including dichloroisocyanurate, trichloroisocyanurate), monochloramine, bromochlorodimethylhydantoin, nitric acid, various nitrate salts, nitrous oxide, sulfuric acid, peroxydisulfuric acid, peroxymonosulfuric acid, 2,2'-dipyridyldisulfide, various hexavalent chromium compounds, chromic and dichromic acids, chromium trioxide, pyridinium chlorochromate, various permanganate salts and/or perborate salts, silver oxide, and/or osmium tetroxide, etc. Notably, while oxidizing biocides have been well know in the art, they have generally not been considered in treatment for produced water. In that context, it is also noted that existing plants for produced water treatment may be upgraded by adding a fluid port or other mixing device to a plant component, preferably at a location where a de-oiling step has already been performed. For example, an oxidizing agent can be used to treat SAGD produced water, which has a large amount of dissolved organics in tight emulsion containing silica, inerts, and TOC at a high pH>8.5. This water typically has a high scaling index and deposits oily scale on all the wetted surfaces including filter media used in its treatment. By treatment of the SAGD produced water using contemplated systems and methods, it is contemplated that up to 90% of the water can be recovered and reused for steam production for enhanced oil recovery in order to comply with environmental regulations.

It should be appreciated that the oxidizing agent can also be used to chemically break an emulsion, and that the oxidizing agent can be further used to remove most of the entrained TOC. Therefore, addition of the oxidizing biocide at a position upstream of the skim tank is also expressly contemplated. Additionally, it is contemplated that further treatment can be achieved by injecting advanced oxidizing biocide for additional TOC reduction to required level. Location and feed rate of advanced biocide injection can more than one place in any appropriate location for maximum effect to reduce TOC. For example, the biocide injection can be fed upstream of a wellhead, at the wellhead, upstream of a separator or tank, and inside the separator or tank. In another example, the biocide injection could be fed inside a skim tank.

Likewise, numerous emulsion breakers (also known as demulsifying agent or demulsifier) can be used with the inventive concept herein, and especially preferred emulsion breakers will be those suitable to break tight emulsions present in produced water (which may include silica and other solid materials). For example, suitable emulsion breakers include various functionalized polymers, polymers containing aromatic and oleophilic groups as described in US 2007/0244248, or compositions of tetrapolymer containing random combinations of acrylic acid, methacrylic acid, methyl methacrylate and butyl acrylate as taught in U.S. Pat. No. 5,100,582. In other examples, U.S. Pat. No. 6,025,426 and U.S. Pat. No. 5,330,650 hydrophilic cationic copolymers of acrylamide are employed, while U.S. Pat. No. 4,582,628 discloses the use of vinyl-type polymers, derived from hydrophilic and hydrophobic vinyl monomers for demulsifying hydrocarbonaceous emulsions of oil and water. Other known emulsion breakers include mixtures of low molecular weight, water soluble, cationic polymers of dimethylaminoethyl acrylate methyl chloride and benzyl chloride quaternary salts as discussed in U.S. Pat. No. 5,643,460, and U.S. Pat. No. 5,472,617 teaches use of (meth)acrylates of oxyalkylates copolymerized with hydrophilic monomers. Similarly CN1883740 discloses the use of polymers derived from hydrophobic(meth)acrylate ester monomers and hydrophilic(meth)acrylic acid monomers, typically having molecular weights of 5,000 to 100,000 g/mol, for demulsifying crude oil and water emulsions. US 2011/0031163 discloses hydrophobically modified, surfactant modified, and lightly crosslinked anionic acrylate copolymers for separating oil and water dispersions or emulsions generated in connection with oilfield operations.

Additionally, or alternatively, water may be further alkalinized to break emulsions, which also assists in silica solubilization. Most typically, the pH of the alkalinized produced water is at least 8.5, more typically between 8.5 and 9.5, even more typically between 9.5 and 10.5, and most typically between 10 and 11 (and in some cases even higher). Viewed from another perspective, it is preferred that the pH of the alkalinized water is higher than the pH of the produced water prior to alkalinization, and typically at least 0.5 pH units, more typically at least 1.0 pH units, and most typically more than 1.5 pH units. Thus, the pH is raised in the produced water to a level such that solubility of silica in the alkalinized water is increased over the solubility of silica in the produced water, in most cases at least 50% (at standard temperature 20° C. and atmospheric pressure), more preferably at least 100%, and most preferably at least 200%. Viewed from a different perspective, it is generally preferred to raise the pH such that silica removal as practiced in heretofore known processes is no longer required. Indeed, it is contemplated that the pH can be raised to a level that allows adding previously isolated silica to the produced water (the alkalinized water, and/or the softened treated water) before the water is fed to the steam generator. Further aspects, methods, and considerations are provided in U.S. patent application having Ser. No. 13/629,258, which is incorporated by reference herein.

With respect to the skim tank it is contemplated that all skim tanks suitable for separation of a multiphase feed into a solid/oil-enriched phase and a solid-depleted phase are deemed suitable, however, especially preferred skim tanks will have a flow-control structure within a container that assists in generating an enhanced toroidal flow to increase and/or facilitate separation, and in which an overflow element is configured to receive the solid/oil-enriched phase. Most preferably, at least some of the solid-depleted phase is returned to and combined with the multiphase feed to so increase up-flow motion of the feed. In especially preferred aspects, the skim tank is fluidly coupled to a FWKO such that the FWKO provides the multiphase feed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. As used herein, the term "solid/oil-enriched phase" refers to a phase that has higher solid/oil content than the phase from which the solid-enriched phase was produced. Similarly, the term "solid-depleted phase" as used herein refers to a phase that has lower solid content than the phase from which the solid/oil-enriched phase was produced.

Most typically, contemplated skim tanks further include a multiphase feed conduit that is configured to release the multiphase feed from the conduit into an inner volume of the flow-control structure, wherein in at least some embodiments the lower opening of the flow-control structure is suspended above the inner bottom surface of the container. While not limiting to the inventive subject matter, it is preferred that the flow-control structure has a cylindrical shape and may further comprise one or more flow directing element to impart vortex motion and/or assist in up-flow of the feed. Alternatively, or additionally, as shown in FIG. 3, a gas source (e.g., compressed $N_2$, air, or other gas) may be coupled to the container and configured to provide gas to the multiphase feed.

Where desired, the flow-control structure may be configured to impart an up-flow motion into the multiphase feed and the overflow element may be configured to redirect the up-flow motion into a side-flow motion. Further contemplated skim tanks may include a second conduit that delivers a fraction of the solid-depleted phase as a rinse fluid via a spray nozzle or other arrangement to an inner surface of the overflow element, and/or an additional conduit to use the solid-depleted phase as a hydro skimmer to enhance sludge transfer to the overflow element. With respect to volume and/or operational control, it is contemplated that the skim tank may also include one or more control elements that allow raising of the liquid level in the container such that at least some of the solid/oil-enriched phase is forced into the overflow element.

Most preferably, the flow control structure has a cylindrical shape and is centrally disposed within a tank, and a multiphase feed conduit releases the multiphase feed from the multiphase feed conduit into an inner volume of the flow-control structure. In such methods, it is further preferred that the lower opening of the flow-control structure is suspended above the inner bottom surface and/or water withdrawal manifold of the container. Therefore, and especially where the overflow element has a conical shape, the flow-control structure imparts an up-flow motion into the multiphase feed and the overflow element redirects the up-flow motion into a side-flow motion to so further drive the toroidal motion.

In further contemplated aspects, the enhanced up-flow is achieved by a flow-control structure that forces flow of the multiphase feed upwardly, and that is arranged such that at least some of the solid-depleted phase in the mixed feed is forced into a toroidal or otherwise closed-loop flow pattern. Such patterns may or may not be supported by the structure of the container or tank in which the control structure is at least partially disposed. As used herein, the term "toroidal" refers to an annular shape that is formed by revolving a circle, ellipsis, or otherwise rounded closed object around an axis external to the circle, ellipsis, or rounded object. To maintain the separation, it is still further preferred that at least some of the solid-depleted phase is removed from a lower portion of the container, and most preferably the bottom portion of the container, and that the floating solid/oil-enriched phase (e.g., oil with flocculated, aggregated, or otherwise agglomerated material, having a density lower than water and typically comprising at least some fluid) is removed by passing the solid phase over an overflow element (e.g., cone or funnel shape) that is preferably disposed within the container.

In still further particularly preferred aspects, it is contemplated that one portion of the solid-depleted phase that has been separated from the multiphase feed is withdrawn from the (preferably bottom portion of the) container and recycled back to the multiphase feed and/or flow control structure. Such recycling will advantageously increase the up-flow rate within the flow control structure and thus further enhance separation efficiency. Additionally, or alternatively, gas (e.g., ambient air, nitrogen, fuel gas, or oxygen) may be added to increase the up-flow and phase separation.

In further preferred aspects, another portion of the solid-depleted phase that has been separated from the multiphase is withdrawn from the system and disposed of and/or routed to other uses. For example, some of the solid-depleted phase that has been separated from the multiphase may also be used as a spray or rinse fluid to move solids located on an inner surface of the overflow element. It should be further recognized that contemplated devices and methods may be operated in a fully automated manner using a control system. Such system may employ various sensors to ascertain fluid/solid levels, flow rates, etc, and depending on the desired degree of separation may control feed rates and/or recycling rates. Further aspects, configurations and methods suitable for use herein are disclosed in U.S. patent application having Ser. No. 12/595,177, incorporated by reference herein.

Consequently, it should be appreciated that a combination of emulsion breaking and skim-out of a floating phase in the skim tank will significantly reduce TOC, as TOC in SAGD produced water is typically entrained to a significant degree in the emulsion phase. Thus, the TOC will leave produced water via skimmed-out oily phase and solid phase. Further TOC reduction is then achieved by oxidizing biocide that oxidize, break down, and/or agglomerate organic compounds. Therefore, TOC can be reduced to 30 ppm or even less. Such is particularly notable as the configurations and methods of the inventive subject matter will be operable without the use of induced gas flotation, solids contact clarifiers, lime softening and/or soda ash softening with associated solids sludge production, sludge dewatering and sludge disposal, pre-filtration (e.g., solids contact clarifiers), and/or centrifugal separation of emulsions. Most typically, where a skim tank is used to separate pre-treated water from the multiphase mixture, the pre-treated water leaving the skim tank will typically have a total organic compound level of below 100 ppm. Further treatment with oxidizing agents can then reduce the TOC to less than 50 ppm, and more typically less than 30 ppm.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of treating produced water from a SAGD operation for recycling to the SAGD operation, comprising:
   receiving the produced water from the SAGD operation, and breaking an emulsion in the produced water to form a multiphase mixture;
   separating the multiphase mixture in a container comprising a flow-control structure that is configured to force a first portion of a solid-depleted phase into a toroidal motion within the container and around the flow control structure;
   wherein the container is configured to allow withdrawal of a second portion of the solid-depleted phase at a location at or below the flow control structure as pre-treated water;
   adding an oxidizing biocide to the pre-treated water in an amount effective to reduce total organic compounds below 30 ppm to so form treated water such that the treated water is produced without lime softening; and
   feeding the treated water to a once-through steam generator to produce steam for the SAGD operation.

2. The method of claim 1 wherein the produced water has a total organic compound (TOC) concentration of ≥350 ppm, a chemical oxygen demand (COD) of ≥1400 ppm, total dissolved solids (TDS) concentration of ≥1800 ppm, and emulsified oil/grease/solids concentration of ≥15 ppm, and wherein the steps of separating and adding the oxidizer reduces TOC and/or COD by at least 80%.

3. The method of claim 1 wherein breaking the emulsion is effected with a polymer containing aromatic and oleophilic groups, a tetrapolymer containing random combinations of acrylic acid, methacrylic acid, methyl methacrylate and butyl acrylate, a hydrophilic cationic copolymer of acrylamide, a polymer derived from hydrophilic and hydrophobic vinyl monomers, cationic polymers of dimethylaminoethyl acrylate methyl chloride and benzyl chloride quaternary salts, a (meth)acrylate of oxyalkylates copolymerized with hydrophilic monomers, a polymer formed from hydrophobic (meth) acrylate ester monomers and hydrophilic (meth)acrylic acid monomers, and/or a hydrophobically modified, surfactant modified, and lightly crosslinked anionic acrylate copolymer.

4. The method of claim 1 further comprising a step of increasing pH of the produced water or of the multiphase mixture.

5. The method of claim 1 wherein the oxidizing biocide is oxygen, ozone, hydrogen peroxide, an inorganic peroxide, fluorine, chlorine, bromine, hypobromous acid, a hypohalite, chlorite, chlorate, percholate, chlorine dioxide, a chloroisocyanurate, monochloramine, bromochlorodimethylhydantoin, nitric acid, a nitrate salt, nitrous oxide, sulfuric acid, peroxydisulfuric acid, peroxymonosulfuric acid, 2,2'-dipyridyldisulfide, a hexavalent chromium compound, pyridinium chlorochromate, a chromate compound, a dichromate compound, a permanganate salt, a perborate salt, silver oxide, and/or osmium tetroxide.

6. The method of claim 1 further comprising a step of filtering the treated water.

7. The method of claim 1 further comprising a step of subjecting the treated water to cation exchange chromatography.

8. The method of claim 1 wherein the once-through steam generator produces the steam from the treated water at an at least 80% steam quality, and recycling at least a portion of the steam to the SAGD operation without upgrading the steam quality.

9. The method of claim 1 further comprising a step of adding additional oxidizing biocide to the produced water and/or the multiphase mixture.

10. A method of treating produced water from a SAGD operation for recycling to the SAGD operation, comprising:
  breaking an emulsion in the produced water to form a multiphase mixture;
  using a skim tank to separate pre-treated water from the multiphase mixture, wherein the pre-treated water has a total organic compound level of below 100 ppm;
  adding an oxidizing biocide to the pre-treated water in an amount effective to reduce total organic compounds below 30 ppm to so form treated water such that the treated water is produced without lime softening; and
  feeding the treated water to a once-through steam generator to produce steam for the SAGD operation.

11. The method of claim 10 wherein breaking the emulsion is effected with a polymer containing aromatic and oleophilic groups, a tetrapolymer containing random combinations of acrylic acid, methacrylic acid, methyl methacrylate and butyl acrylate, a hydrophilic cationic copolymer of acrylamide, a polymer derived from hydrophilic and hydrophobic vinyl monomers, cationic polymers of dimethylaminoethyl acrylate methyl chloride and benzyl chloride quaternary salts, a (meth)acrylate of oxyalkylates copolymerized with hydrophilic monomers, a polymer formed from hydrophobic (meth) acrylate ester monomers and hydrophilic (meth)acrylic acid monomers, and/or a hydrophobically modified, surfactant modified, and lightly crosslinked anionic acrylate copolymer.

12. The method of claim 10 wherein the oxidizing biocide is oxygen, ozone, hydrogen peroxide, an inorganic peroxide, fluorine, chlorine, bromine, hypobromous acid, a hypohalite, chlorite, chlorate, percholate, chlorine dioxide, a chloroisocyanurate, monochloramine, bromochlorodimethylhydantoin, nitric acid, a nitrate salt, nitrous oxide, sulfuric acid, peroxydisulfuric acid, peroxymonosulfuric acid, 2,2'-dipyridyldisulfide, a hexavalent chromium compound, pyridinium chlorochromate, a chromate compound, a dichromate compound, a permanganate salt, a perborate salt, silver oxide, and/or osmium tetroxide.

13. The method of claim 10 further comprising a step of subjecting the treated water to cation exchange chromatography.

14. The method of claim 10 further comprising a step of adding additional oxidizing biocide to the produced water and/or the multiphase mixture.

15. The method of claim 10 wherein the once-through steam generator produces the steam from the treated water at an at least 80% steam quality, and recycling at least a portion of the steam to the SAGD operation without upgrading the steam quality.

16. A SAGD operation system, comprising:
  a well head configured to produce a hydrocarbon product and produced water, and a first fluid injection port configured to allow combination of the produced water to form a multiphase mixture;
  a skim tank fluidly coupled to the well head and configured to separate the multiphase mixture using a flow-control structure that is configured to force a first portion of a solid-depleted phase into a toroidal motion within the skim tank and around the flow control structure;
  wherein the skim tank is further configured to allow withdrawal of a second portion of the solid-depleted phase at a location at or below the flow control structure as pre-treated water;
  a second fluid injection port configured to allow combination of the pre-treated water with an oxidizing biocide in an amount effective to reduce total organic compounds below 30 ppm to so form treated water such that the treated water is produced without lime softening; and
  a once-through steam generator fluidly coupled to the container and configured to produce steam for the SAGD operation from the treated water.

17. The SAGD operation system of claim 16 further comprising a filtration unit fluidly coupled between the skim tank and the once-through steam generator.

18. The SAGD operation system of claim 16 further comprising a cation exchange unit fluidly coupled between the skim tank and the once-through steam generator.

19. The SAGD operation system of claim 16 configured to allow recycling of at least 80% of the produced water to a formation connected to the well head without upgrading the steam quality from the once-through steam generator.

20. The SAGD operation system of claim 16 wherein the skim tank is further configured to allow recycling of at least some of the second portion of the solid-depleted phase back into the flow control structure, and further includes an overflow element arranged in the container that is configured to allow removal of a solid-enriched phase separated from the multiphase mixture.

* * * * *